Patented Aug. 3, 1954

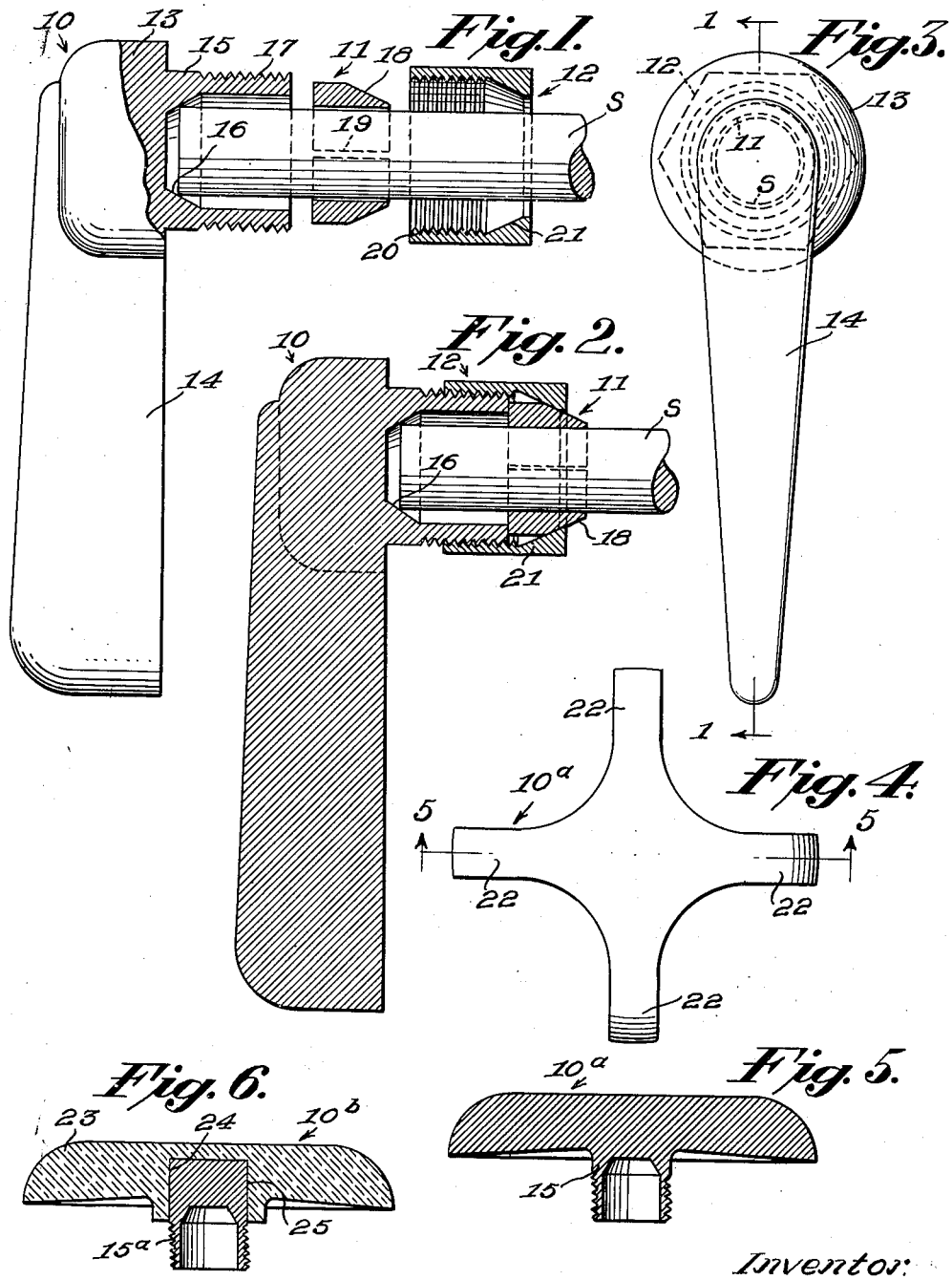

2,685,466

UNITED STATES PATENT OFFICE 2,685,466

HANDLE FOR VALVE STEMS AND THE LIKE

William R. Middleton, Jacksonville, Fla.

Application August 21, 1951, Serial No. 242,868

1 Claim. (Cl. 287—53)

This invention relates to a handle for valve stems and the like.

There are a number of valve stem handles now in use and which, in most instances, require some form of machining operations on the valve stems for operative association of the handles therewith.

The more common form of handle now in use is one having a rectangular aperture or socket in which is received a rectangular end portion of the valve stem, together with a screw extended through the handle and into a tapped opening in the rectangular end of the stem.

While this form of valve stem handle may prove satisfactory for a limited period of use, the corners on the valve stem rectangular end portion become worn and in time the handle no longer has a proper fit with the stem.

Furthermore, with this form of handle, it is necessary that a particular one be obtained for use with any particular valve stem, and ofttimes when the handle becomes lost it is difficult to secure one to properly fit the particular valve stem.

Other forms of valve stem handles now in use are the commonly known ones wherein a screw extends through a lateral tapped opening in the handle for engagement of its free end with the cylindrical surface of the valve stem.

With this form of handle, the screw does not exert sufficient pressure on the stem to preclude relative turning of the handle and stem, with the result that in time a circumferential groove is cut in the stem by the screw, weakening the stem to such extent that the end portion beyond the groove becomes broken off.

Furthermore, with this form of handle, it is necessary to secure a particular size for any particular stem.

Other forms of handles now in use are those in which it is necessary to slit the end of the valve stem for operative association of the handle therewith. This form of handle is also objectionable both from the standpoint of weakening the stem and also because a particular size handle is required for a particular stem.

Accordingly, a primary object of this invention is to provide a handle readily adaptable to variable sizes of valve stems and which is capable of operative association therewith without any machining operations on the stems.

A further object of the invention is to provide valve stem handles which include a yieldable adapter which is frictionally engageable with cylindrical stems of variable diameters throughout the circumferences thereof.

A still further object of the invention is to provide a valve stem handle which is capable of assembly with valve stems of variable diameters by any one capable of using a small wrench or pliers and without requiring the services of a skilled mechanic.

A still further object of the invention is to provide a valve stem handle which is relatively simple in construction and which possesses a streamlined exterior in the absence of recesses or cavities which are prone to collect dirt.

Other objects and advantages of the invention will become apparent in the course of the following detailed description, taken in connection with the accompanying drawing, wherein Figure 1 is a vertical axial section of the improved handle, in the plane of line 1—1 on Fig. 3, with the three cooperating parts thereof shown in separated position on a valve stem, preparatory to effecting the releasable connection of the handle with the stem, a portion of the handle being shown in elevation.

Fig. 2 is a view similar to Fig. 1 with the handle assembled on the stem.

Fig. 3 is an elevational view as observed from the left of Fig. 1 or Fig. 2.

Fig. 4 is an elevational view of a modified form of handle.

Fig. 5 is a horizontal sectional view as observed in the plane of line 5—5 on Fig. 4.

Fig. 6 is a horizontal sectional view corresponding to Fig. 5 and showing a still further modified form of handle.

Referring now in detail to the drawing, and first to Figs. 1, 2 and 3, the improved adjustable handle comprises three cooperating elements, the handle proper 10, a split ferrule or adapter 11, and an internally threaded nut 12.

The handle proper 10 comprises a knob-like portion 13 from which depends the lever 14. The handle proper further includes a cylindrical extension 15 having the inner end of the bore thereof tapered as at 16, and which is externally threaded as at 17.

The split ferrule or adapter 11 is in the form of a cylindrical member for receiving the stem S, and it is provided with a bevelled inner end 18 and is longitudinally split as at 19.

The nut 12 is internally threaded as at 20 and at its inner end is bevelled, as at 21, for cooperation with the adapter bevel 18, as will later appear.

The handle is shown in Fig. 2 as being assembled on the stem S, and in the assembly the nut 12 is first pushed rearwardly on the stem S. The adapter 11 is subsequently pushed rearwardly on the stem, and lastly the handle proper 10 is pushed rearwardly on the end of the stem, which end engages the bevelled wall 16 which functions to properly center the stem with respect to the handle.

The parts are at this stage positioned as in Fig. 1. With the parts thus positioned, the ferrule or adapter 11 is moved into contact with the free end of extension 15, whereupon the nut 12 is passed over the adapter and threaded onto extension 15 with the bevelled surface 18 on the adapter frictionally engaged by the bevelled surface 21 on the nut.

Upon drawing the nut up tight, the split ferrule or adapter 11, which is shown loose on the stem in Fig. 1, is contracted into firm frictional engagement with the stem, as in Fig. 2, with the gap 19 substantially reduced in width.

When thus secured, a substantial cylindrical surface of the adapter tightly engages a corresponding surface of the stem, thereby providing a secure connection between the handle and stem.

By the provision of the split ferrule 11 the handle is readily adaptable to valve stems of variable diameters. As indicated in Fig. 2, for example, the ferrule or adapter is capable of further contraction, and for a substantially larger stem the split adapter may be initially expanded upon assembling same on the stem.

The handle structure above described is preferably of metal, and it is to be particularly noted that the lever 14 blends into the knob-like portion 13 in the absence of any dirt-accumulating crevices or depressions as are common with many handles now in use.

A modified form of metallic handle 10ª is illustrated in Figs. 4 and 5, which is also of streamline form and which is of cross design in elevation, as indicated at 22.

In accordance with the modified form of handle 10ᵇ in Fig. 6, a plastic handle 23 is provided and same is formed with a socket 24 in which is embedded a solid projection 25 of the metallic cylindrical extension 15ª.

From the foregoing disclosure, it will be appreciated that a novel form of valve stem handle is provided and which is adapted for firm connection with cylindrical valve stems of variable diameters, and which is of such construction that it is capable of assembly by practically any person.

While I have disclosed my invention in accordance with certain specific structural embodiments thereof, such is to be considered as illustrative only, and not restrictive, the scope of the invention being defined in the following claim.

What I claim and desire to secure by U. S. Letters Patent is:

A handle for smooth surfaced cylindrical stems comprising a hand-engageable portion, a cylindrical extension on said portion having an externally threaded wall and an inner wall, said inner wall including a major cylindrical wall portion concentric with said external threaded wall and a minor circumferentially continuous wall portion converging from the inner end of said cylindrical portion and terminating in a wall normal to the axis of the extension, an annular expansible and contractible member surrounding said stem and whose inner diameter in both its expanded and contracted positions is less than the diameter of said cylindrical inner wall portion of said extension, said member having an end wall engaged with the end wall of said extension, and a cylindrical nut movable along said stem, and having threads on its inner wall engaged with the threads on the outer wall of said cylindrical extension, said member and said nut having cooperating beveled camming surfaces for contracting said member into firm frictional engagement with said stem upon threading said nut onto said extension, said converging wall portion on said extension being engaged with the free end of the stem for centering same with respect to the handle.

References Cited in the file of this patent

UNITED STATES PATENTS

| Number | Name | Date |
| --- | --- | --- |
| 524,848 | Doebler | Aug. 21, 1894 |
| 1,012,102 | Sachs | Dec. 19, 1911 |
| 1,107,401 | Bissell | Aug. 18, 1914 |
| 1,267,959 | Becker | May 28, 1918 |
| 1,323,147 | Becker | Nov. 25, 1919 |
| 1,365,357 | Twiss | Jan. 11, 1921 |
| 1,420,295 | Tait | June 20, 1922 |
| 1,491,342 | Eckhardt | Apr. 22, 1924 |
| 1,557,923 | Carroll | Oct. 20, 1925 |
| 1,632,227 | Halsey | June 14, 1927 |
| 1,649,923 | Post | Nov. 22, 1927 |
| 1,730,579 | Lehnert | Oct. 8, 1929 |
| 2,271,075 | Hulshizer | Jan. 27, 1942 |
| 2,290,815 | Ruppel | July 21, 1942 |